United States Patent [19]
Kawa et al.

[11] Patent Number: 5,984,835
[45] Date of Patent: *Nov. 16, 1999

[54] HYDRAULIC CONTROL SYSTEM FOR AUTOMATIC TRANSMISSION

[75] Inventors: Takeyoshi Kawa; Tomoo Sawazaki; Hiroshi Shinozuka; Junichi Doi, all of Hiroshima, Japan

[73] Assignee: Mazda Motor Corporation, Hiroshima, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/751,684

[22] Filed: Nov. 18, 1996

[30] Foreign Application Priority Data

Nov. 17, 1995 [JP] Japan ................... 7-323995

[51] Int. Cl.⁶ ............................ F16H 61/06
[52] U.S. Cl. .......................... 477/150; 477/117
[58] Field of Search .................. 477/150, 152, 477/154, 116, 117; 138/31

[56] References Cited

U.S. PATENT DOCUMENTS

| | | | |
|---|---|---|---|
| 2,546,055 | 3/1951 | Ballard | 138/31 |
| 3,703,228 | 11/1972 | Chana | 192/85 R |
| 3,714,847 | 2/1973 | Ushijima | 477/150 |
| 4,495,837 | 1/1985 | Morscheck | 477/150 X |
| 4,648,423 | 3/1987 | Henken . | |
| 4,875,391 | 10/1989 | Leising et al. . | |
| 4,875,665 | 10/1989 | Kato et al. . | |
| 5,063,814 | 11/1991 | Baba et al. | 477/154 X |
| 5,366,420 | 11/1994 | Kuriyama et al. | 192/85 R X |
| 5,393,273 | 2/1995 | Haka | 477/150 X |
| 5,399,131 | 3/1995 | Kamada et al. | 477/152 X |
| 5,492,028 | 2/1996 | Raszkowski | 477/150 X |
| 5,725,455 | 3/1998 | Kamada et al. | 477/168 X |

FOREIGN PATENT DOCUMENTS

0 564 363 A1  10/1993  European Pat. Off. .
0 626 528 A2  11/1994  European Pat. Off. .

*Primary Examiner*—Charles A Marmor
*Assistant Examiner*—Scott Lund
*Attorney, Agent, or Firm*—Sixbey, Friedman, Leedom & Ferguson, P.C.; Donald R. Studebaker

[57] ABSTRACT

An automatic transmission control system having a hydraulic control circuit for supplying operating pressure selectively to a plurality of friction coupling elements to place the transmission in desired gears includes a pressure generator for generating operating pressure and supplying it to specific coupling elements which operate in response to operating pressure at different highest levels and an accumulator having a spring loaded piston which provides an increase in operating pressure at a rate variable according to movement of the piston, the rate being greater for greater piston movement as compared with for smaller piston movement, the accumulator being brought into communication selectively with the specific coupling elements by means of a switching element.

14 Claims, 9 Drawing Sheets

TABLE I

| | FORWARD CLUTCH (51) | 2-4 BRAKE (54) | 3-4 CLUTCH (53) | LOW-REVERSE BRAKE (55) | REVERSE CLUTCH (52) | ONE-WAY CLUTCH (56) |
|---|---|---|---|---|---|---|
| 1ST GEAR | ○ | | | (○) | | ○ |
| 2ND GEAR | ○ | ○ | | | | |
| 3RD GEAR | ○ | | ○ | | | |
| 4TH GEAR | | ○ | ○ | | | |
| REVERSE GEAR | | | | ○ | ○ | |

FIG. 12

TABLE II

| RANGE | D (S) | | | | L | R |
|---|---|---|---|---|---|---|
| GEAR | 1ST GEAR | 2ND GEAR | 3RD GEAR | 4TH GEAR | 1ST GEAR | REVERSE GEAR |
| 1ST SV | X | X | X | ○ | ○ | ○ |
| 2ND SV | X | X | X | X | ○ | ○ |
| 1ST DSV | X | ○ | ○ | ○ | ○ | ○ |
| 2ND DSV | X | X | ○ | ○ | X | ○ |
| 3RD DSV | ○ | ○ | ○ | X | ○ | ○ |

HYDRAULIC CONTROL SYSTEM FOR AUTOMATIC TRANSMISSION

BACKGROUND OF THE INVENTION

1. Field of the Invention

The invention relates to a hydraulic control system for an automatic transmission, and, more specifically, to an automatic transmission control system of the type utilizing a hydraulic control circuit to which an accumulator is incorporated.

2. Description of Related Art

Automatic transmissions used in automotive applications include a transmission gear mechanism which is driven by input torque from an engine through a torque converter. The torque transmission path within the transmission gear mechanism is changed by selectively locking and unlocking a plurality of friction coupling elements, such as clutches and brakes, to automatically place the automatic transmission in desired gears according to driving conditions. This type of automatic transmission is equipped with a hydraulic control circuit which manages the supply of hydraulic operating pressure to the friction coupling elements.

Hydraulic control circuit includes a hydraulic pressure source, such as a regulator valve which develops line pressure as source pressure for the hydraulic operating pressure and a duty solenoid valve which directly generates hydraulic operating pressure to be delivered to the friction coupling elements, shift valves which serve as a switching means to selectively direct the hydraulic operating pressure between the friction coupling elements. In order for the hydraulic control circuit to promote a gentle rise in pressure level of the hydraulic operating pressure for the friction coupling elements, or in order for the hydraulic control circuit to absorb fluctuations in the hydraulic operating pressure in the case where the hydraulic operating pressure is generated directly by the duty solenoid valve, an accumulator is further incorporated in the hydraulic control circuit between the hydraulic pressure source and the friction coupling elements. This spring loaded accumulator shifts a piston against a spring in response to the hydraulic operating pressure.

Because effective operating pressures needed by the respective friction coupling elements are not at the same highest level, operating characteristics of the accumulators must be different to comply with the specific hydraulic operating demands of the respective friction coupling elements. As a specific example, since a band brake used in a second gear is applied in a wide range of engine throttle operating conditions from a full throttle condition to a throttled-down condition, the accumulator for the band brake must be able to operate reliably with high hydraulic operating pressure. Conversely, since a low-reverse brake, which is used in a reverse gear or in a first gear serving as engine brake in a low (L) range, is applied when the engine throttle opening is relatively small, the accumulator utilized for the low-reverse brake must be able to operate reliably with relatively low hydraulic operating pressure.

An automatic transmission control system, such as known in U.S. Pat. No. 4,875,391, which accommodates such demands for operating characteristics, is equipped with separate accumulators for the respective friction coupling elements in a hydraulic control circuit. In this prior art automatic transmission control system, as a result of the utilization of separate accumulators for the respective friction coupling elements, an increased number of accumulators must be installed in a control valve unit, which always poses certain design problems in regard to space and layout, and makes it difficult to provide a compact design of control valve unit for integration into the automatic transmission.

It has been considered to utilize a single accumulator of a type capable of providing a sufficient piston stroke at low hydraulic operating pressure while providing reliable operation with high hydraulic operating pressure, and having the ability to effectively absorb fluctuations in hydraulic operating pressure, which can accommodate the demands for hydraulic operating pressure at different highest levels commonly to more-than-one frictional coupling elements. However, a compression spring utilized in this type of accumulator must have a long physical dimension with a relatively small spring constant which imposes various dimensional constraints on the accumulator. If this type of accumulator is to be integrated into the control valve unit, it would still not solve the design problems in regard to the size and layout of the control valve unit.

SUMMARY OF THE INVENTION

It is an object of the invention to provide a hydraulic control system for an automatic transmission which enables the design of a smaller control valve unit by means of the use of a single accumulator capable of accommodating itself to effective hydraulic operating pressure at different highest levels demanded by a plurality of frictional coupling elements while solving the design problems in regard to the size and layout of the control valve unit.

The above object of the invention is achieved by providing a hydraulic control system for an automatic transmission which has a hydraulic control circuit for delivering hydraulic operating pressure selectively to a plurality of friction coupling elements to change a torque transmission path of a transmission gear mechanism of the automatic transmission. The hydraulic control circuit includes a hydraulic pressure generating means for generating hydraulic operating pressure and supplying the hydraulic operating pressure to specific friction coupling elements which operate in response to effective hydraulic operating pressure at different highest levels, an accumulator having a spring loaded piston which provides an increase in the hydraulic operating pressure at a rate which is greater for greater movement of the piston as compared with for smaller movement of the piston, and switching means for bringing the accumulator into communication selectively with the specific friction coupling elements. For example, the first specific friction coupling element may be one that operates in response to the effective hydraulic operating pressure at a higher highest level during a 1st to 2nd gear shift, and the second specific friction coupling element may be one that operates in response to the hydraulic operating pressure at a lower highest level during a neutral to reverse range shift.

Because the accumulator is brought into communication selectively with the specific friction coupling elements, which operate in response to effective hydraulic operating pressures at different highest levels, through the switching means a single accumulator is able to modulate the supply of hydraulic operating pressure and absorbing fluctuations in hydraulic operating pressure while the hydraulic operating pressure is supplied to the respective specific friction coupling elements. Further, because the accumulator provides an increase in changing rate of the hydraulic operating pressure greater when piston movement is greater as compared when piston movement is shorter, a sufficient and effective piston stroke is certainly obtained in a range of lower operating pressure while still maintaining desirable operating characteristics when the hydraulic operating pressure is higher. Accordingly, in spite of the difference in effective hydraulic operating pressure at the highest level needed by each specific frictional coupling element, the supply of hydraulic operating pressure to the specific frictional coupling elements is effectively modulated without the need for the accumulator to incorporate a long piston spring.

The hydraulic pressure generating means may be common to the specific friction coupling elements, and connected to the switching means through a single pressure line in which the accumulator is installed upstream from the switching means. Because the accumulator is installed upstream from the switching means, the accumulator is automatically included in a line in which communication between either one of the specific friction coupling elements and the hydraulic pressure generating means is provided in response to switching the communication of the hydraulic pressure generating means to the one of the specific friction coupling elements from another specific friction coupling element. As a result, the need for a specific means to switch the communication of the accumulator between the specific frictional coupling elements is eliminated.

The utilization may be made of a duty solenoid valve as the pressure source generating means which generates the hydraulic operating pressure in response to line pressure as source pressure. In this case, the hydraulic control system described above provides for effective absorption of fluctuations in hydraulic operating pressure, regardless of the hydraulic pressure level, easily caused owing in particular to the duty solenoid valve. In this instance, the accumulator may structured to provide the changing rate of hydraulic operating pressure in two steps according to different ranges of piston strokes. Further, the accumulator may have a first spring which exerts spring force on the piston throughout an entirely available stroke of said piston and a second spring which exerts spring force on said piston only when the piston moves beyond a specified stroke.

Alternatively, the accumulator provides an increase in the hydraulic operating pressure at a changing rate steplessly variable with an increase in movement of the piston. In this instance, the accumulator may have a compression coil spring which increases a changing rate of the hydraulic operating pressure with progress in compression of the compression spring. Further, the compression coil spring may have a non-uniform coil pitch, or otherwise a non-uniform coil diameter.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE SPECIFIC EMBODIMENTS

Figure 1:
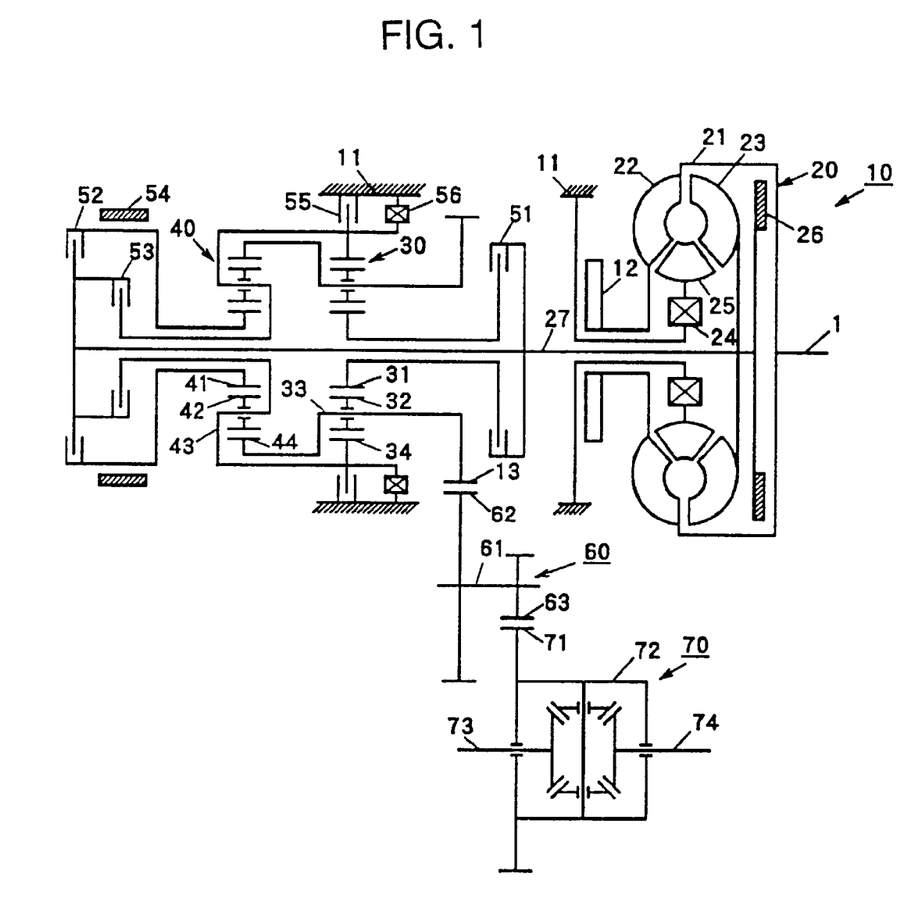
FIG. 1 is a skeleton diagram showing an automatic transmission controlled by a hydraulic control system of the invention.

Reference to the drawings in detail, and, in particular, to FIG. 1 which shows a mechanical layout of an automatic transmission equipped with a hydraulic control system according to an embodiment of the invention, the automatic transmission 10 includes as its main components a torque converter 20, two planetary gear sets 30 and 40 which serve as a transmission gear mechanism which is driven by output torque from the torque converter 20, a plurality of friction coupling elements 51 through 55, such as clutches and brakes, which are selectively locked and unlocked to change the power transmission path of these planetary gear sets 30 and 40, and a one-way clutch 56. The planetary gear set 30 is hereafter referred to as the first or front gear set, and the planetary gear set 40 as the second or rear gear set. The term "front" used herein shall refer the side close to the torque converter 20, and the term "rear" used herein shall refer the side remote from the torque converter 20. This structure enables the automatic transmission to be selectively placed into 1st, 2nd, 3rd, and 4th gears in a drive (D) range, 1st, 2nd, and 3rd gears in a second (S) range, 1st and 2nd gears in a low (L) range, and a reverse gear in a reverse (R) range.

Torque converter 20 is comprised of a pump 22 fixedly mounted within a torque converter casing 21 to which an engine output shaft 1 is fastened, a turbine 23 disposed to face the pump 22 and driven by a working oil from the pump 22, a stator 25 installed between the pump 22 and turbine 23 and supported by a transmission casing 11 through a one-way clutch 24 for multiplying engine torque, and a lockup clutch (LUC) 26 installed between casing 21 and turbine 23 for mechanically coupling the turbine 23 and the engine output shaft 1 together. Torque applied to the turbine 23 is delivered to the planetary gear sets 30 and 40 through the turbine shaft 27. Behind the torque converter 20 there is installed an oil pump 12 which is driven by the engine output shaft 1 through the torque converter casing 21.

Each of the front and rear planetary gear sets 30 and 40 is comprised of a sun gear 31, 41, pinion gear sets 32, 42 which mesh with the sun gears 31, 41, a pinion carrier 33, 42 which supports the pinion gear sets 32, 42, and a ring gear 34, 44 which meshed with the pinion gear sets 32, 42. The automatic transmission further includes various friction coupling elements, such as a forward clutch (FWC) 51 positioned between the turbine shaft 27 and the sun gear 31 of the front planetary gear set 30, a reverse clutch (RVC) 52 positioned between the turbine shaft 27 and the sun gear 41 of the rear planetary gear set 40, a 3-4 clutch (3-4C) 53 positioned between the turbine shaft 27 and the pinion carrier 43 of the rear planetary gear set 40, and 2-4 brake (2-4B) 54 for locking the sun gear 41 of the rear planetary gear set 40. The ring gear 34 of the front planetary gear set 30 and the pinion carrier 43 of the second planetary gear set 40 are connected to each other. A low-reverse brake (LRB) 55 and a one-way clutch 56 are installed between the transmission casing 11 and these ring gear 34 and pinion carrier 43 to be in parallel with respect to each other. A transmission output gear 13 is connected to both of the pinion carrier 33 of the front planetary gear set 30 and the ring gear 44 of the rear planetary gear set 40 which are connected to each other. The automatic transmission has a transmission output gear 13 in engagement with an intermediate gear train 60 which includes first and second intermediate gears 62 and 63 secured to an idler shaft 61 forming part of the intermediate gear train 60. The second intermediate gear 63 is in engagement with an input gear 71 of a differential gear 70. Output torque of the transmission output gear 13 is transmitted to a differential casing 72 of the differential gear 70 and then to left and right wheels 73 and 74.

Figure 11:
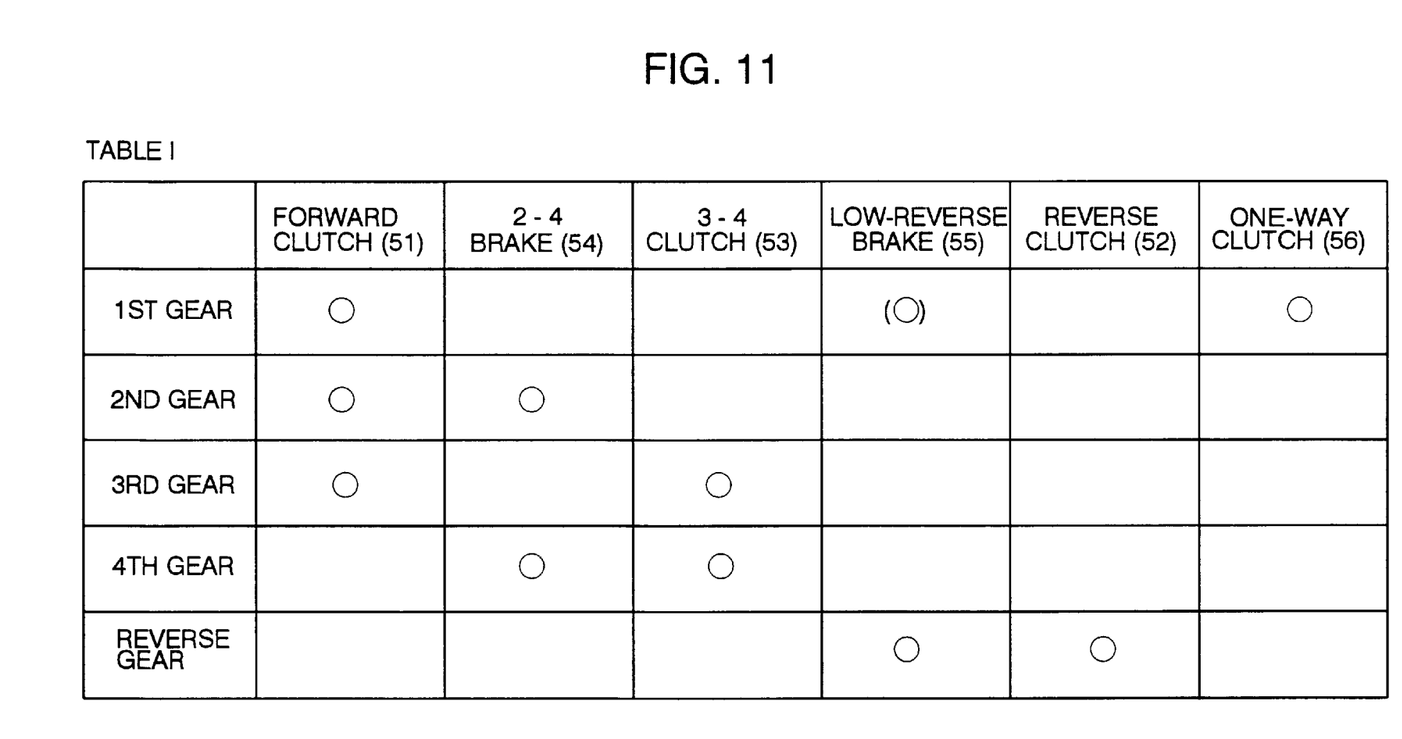
FIG. 11 is a table indicating operating patterns of friction coupling elements.

Operational patterns of these clutches and brakes 51 through 55 and one-way clutch 56 as friction coupling elements are shown in Table I in FIG. 11. In Table I, the element indicated by a circle in parentheses operates in the low (L) range only.

Figure 2:
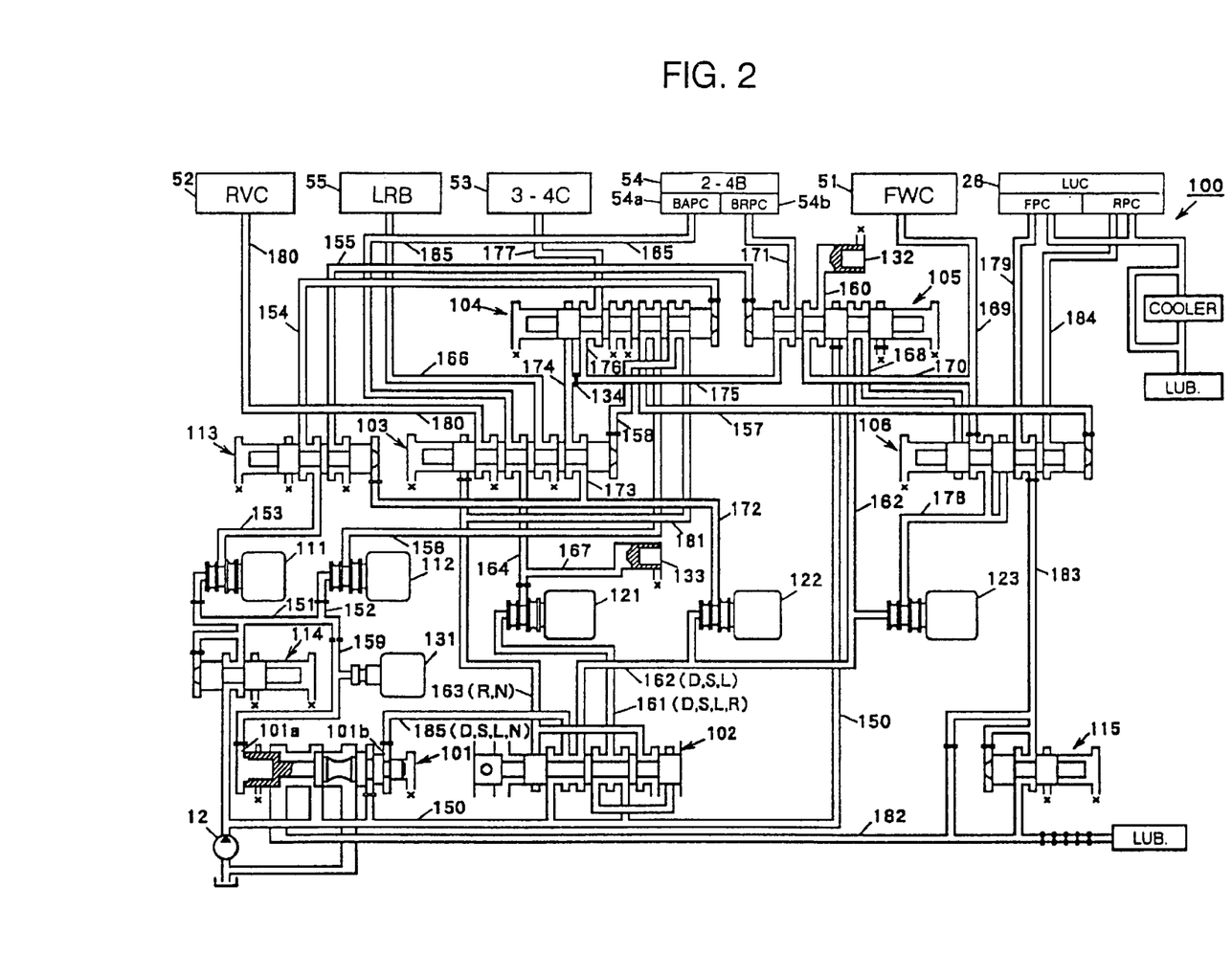
FIG. 2 is a diagram of a hydraulic control circuit of the hydraulic control system in accordance with an embodiment of the invention.

Automatic transmission 10 incorporates a hydraulic control circuit 100 shown in FIG. 2 which selectively locks and unlocks the clutches and brakes 51 through 55 in the patterns shown in Table I. The 2-4 brake (2-4B) 54 which is comprised of a band brake has a brake applying pressure chamber (BAPC) 54a and a brake releasing pressure chamber (BRPC) 54b. The 2-4 brake (2-4B) 54 is locked to apply brake when hydraulic operating pressure is supplied into the brake applying pressure chamber (BAPC) 54a only, and unlocked to release brake when hydraulic operating pressure is supplied into the brake release pressure chamber (BRPC) 54b only, when no hydraulic operating pressure is supplied into both of the pressure chambers 54a and 54b, or when hydraulic operating pressure is supplied into both of the pressure chambers 54a and 54b. Each of the remaining clutches and brakes 51 through 53 and 55 has a single pressure chamber and is locked by means of application of hydraulic operating pressure to the pressure chamber.

Hydraulic control circuit 100 includes various valves as primary elements, such as a regulator valve 101, a manually operated shift valve (manual shift valve) 102, a low-reverse valve 103 (which changes the hydraulic power path to frictional coupling elements 51 through 55 when a shift is executed), a bypass valve 104, a 3-4 shift valve 105, a lockup control valve 106, and first and second ON-OFF solenoid valves 111 and 112, a solenoid relay valve 113, solenoid reducing valve 114, and a converter relief valve 115. The regulator valve 101 regulates line pressure. The manual shift valve 102 is operated to change the range of transmission. The valves 103 through 106 are controlled in operation by the first and second ON-OFF solenoid valves 111 and 112 to change the path of hydraulic operating pressure to the respective clutches and brakes 51 through 55. The solenoid relay valve 113 switches the destination of hydraulic operating pressure from the solenoid valve 111. The reducing valve 114 reduces the line pressure to a specified level and supplies it to the first and second solenoid valves 111 and 112). The converter relief valve 115 establishes a specific level of hydraulic operating pressure and supplies it to the lockup control valve 106.

Hydraulic control unit 100 further incorporates first, second, and third duty solenoids 121, 122, and 123 to generate and adjust hydraulic operating pressure delivered to the pressure chambers of the clutches and brakes 51 through 55 and to release the hydraulic operating pressure from them. The solenoid valves 111 and 112 and duty solenoid valves 121, 122, and 123 are of a three-way type of valves which is able to take an intercommunication state where it provides a hydraulic path between pressure lines upstream and downstream therefrom when the solenoid valves 111 and 112 assume an ON state, and a drain state where hydraulic operating pressure in the pressure line downstream therefrom is drained when the duty solenoid valves 121, 122 and 123 assume an OFF state. The duty solenoid valves open to provide the hydraulic path between the pressure lines upstream and downstream therefrom according to duty rates which are represented by percentages of the ON state duration with respect to a single ON-OFF cycle. Specifically, the duty solenoid valve remains fully open for the duration of a single cycle when the duty ratio is 0 (zero) %. and is shut off to block the hydraulic operating path and drain the pressure line downstream therefrom when the duty ratio is 100%. For duty ratios between 0 and 100%, the duty solenoid valve converts upstream hydraulic operating pressure as source pressure to downstream operating pressure adjusted according to duty ratios.

Regulator valve 101 adjusts output pressure discharged from the oil pump 12 to a specific line pressure and delivers it to the manual shift valve 102 through a main pressure line 150, and to the reducing valve 114 and 3-4 shift valve 105. As was mentioned previously, the line pressure applied to the reducing valve 114 is adjusted to the specific level and delivered to the first and second solenoid valves 111 and 112 through pressure lines 151 and 152, respectively. The specific level of line pressure is supplied to the relay valve 113 through a pressure line 153 when the first solenoid valve 111 assumes the ON state and further supplied as pilot pressure to a control port of a bypass valve 104 at its right end position (as viewed in FIG. 2) through a pressure line 154 to the end control port of bypass valve 104 to cause the bypass valve 104 to force its spool toward its left end position when the relay valve 113 has shifted its spool to its left end position. Moreover, when the relay valve 113 has shifted its spool to the left end position, the line pressure is supplied as pilot pressure to a control port of the 3-4 shift valve 105, thus causing the 3-4 shift valve 105 to shift its spool to its right end position. When the second solenoid valve 112 assumes the ON state, the specific level of hydraulic operating pressure from the reducing valve 114 is supplied to the bypass valve 104 through a pressure line 156 and, when the bypass valve 104 has shifted the spool to the right end position, further supplied as pilot pressure to a control port of the lockup control valve 106, thus causing the lockup control valve 106 to shift its spool to its left end position. When the bypass valve 104 has shifted the spool to its left end position, the specific level of hydraulic operating pressure is supplied as pilot pressure to a control port of the low-reverse valve 103 to cause it to shift its spool to its left end position.

The specific level of hydraulic operating pressure from reducing valve 114 is also supplied, through a pressure line 159, to a regulation port 101a of the regulator valve 101 and adjusted by a linear solenoid valve 131 installed in the pressure line 159 according, for instance, to engine loads or other engine operating conditions. Accordingly, the line pressure is adjusted through the operation of linear solenoid valve 131 according to engine loads or other engine operating conditions.

Main pressure line 150, which leads to the 3-4 shift valve 105, is brought into communication with a first accumulator 132 through a pressure line 160 when the 3-4 shift valve 105 has shifted its spool to its right end position, thus introducing the line pressure into the first accumulator 132. The manual shift valve 102 delivers the line pressure supplied through the main pressure line 150 to both first and second output pressure lines 161 and 162 when the manual valve 102 selects any one of the drive (D), second (S), and low (L) ranges, to first and third output pressure lines 161 and 163 when it selects the reverse (R) range, or to the third output pressure line 163 when it selects the neutral (N) range. The first output pressure line 161 leads to the first duty solenoid valve 121 to deliver the line pressure as control source pressure to it. On the downstream side of the first duty solenoid valve 121, a pressure line 164 leads to the low-reverse valve 103. When the low-reverse valve 103 has shifted its spool to its right end position, the hydraulic path is brought into communication with the brake applying pressure chamber (BAPC) 54a of the 2-4 brake (2-4B) 54 through a servo apply pressure line 165. On the other hand, when the low-reverse valve 103 has shifted its spool to its left end position, the hydraulic path is brought into communication with the pressure chamber of the low-reverse brake (LRB) 55 through a low-reverse brake pressure line 166. A pressure line 167 branches off from the pressure line 164 and leads to the second accumulator 133.

Second output pressure line 162, which leads to both second and third duty solenoid valves 122 and 123 as well as the 3rd-4th shift valve 105, delivers the line pressure as control pressure to them. The second output pressure line 162 leading to the 3-4 shift valve 105 is brought into communication with the lockup control valve 106 when the 3-4 shift valve 105 has shifted its spool to its left end position, and further, in the event where the lockup control valve 106 has shifted its spool to its left end position, to the pressure chamber of the forward clutch (FWC) 51 through a forward clutch pressure line 169.

Pressure line 170, which branches off from the forward clutch pressure line 169 and leads to the 3-4 shift valve 105, is brought into communication with the first accumulator 132 through the pressure line 160 when the spool in valve 105 has shifted its spool to its left end position, and with the brake release pressure chamber (BRPC) 54b of the 2-4 brake (2-4B) 54 when the 3-4 shift valve 105 has shifted its spool to its right end position. The pressure line 172, which is downstream from the second duty solenoid valve 122 to which control pressure is supplied from the second output pressure line 162, feeds pilot pressure to the control port of the relay valve 113. A branch pressure line 173 branching off from a pressure line 172 is brought into communication with the low-reverse valve 103 when the relay valve 113 has shifted it spool to its left end position, and to a pressure line 174 when it has shifted the spool to its right end position.

A pressure line 175 branching off from the pressure line 174 at an orifice 134 and leading to the 3-4 shift valve 105 is brought into communication with the brake release pressure chamber (BRPC) 54b of the 2-4 brake (2-4B) 54 through a servo release pressure line 171 when the 3-4 shift valve 105 has shifted the spool to the left end position. A pressure line 176 branching off from the pressure line 175 and leading to the bypass valve 104 is brought into communication with the pressure chamber of the 3-4 clutch (3-4C) 53 through a 3-4 clutch pressure line 177 when the bypass valve 104 has shifted its spool to its right end position. The pressure line 174 leads directly to the bypass valve 104 and is brought into communication with the pressure line 175, bypassing the orifice 34, through the pressure line 167 when the bypass valve 104 has shifted the spool to its left end position. A pressure line 178, located on the downstream side of the third duty solenoid valve 123 which receives the control pressure from the second output pressure line 162 and leading to the lockup control valve 106, is brought into communication with the forward clutch pressure line 169 when the lockup control valve 106 has shift the spool to its right end position, or to a front pressure chamber (FPC) of the lockup clutch (LUC) 26 through a pressure line 179 when it has shift the spool to its left end position.

Third output pressure line 163, extending from the manual shift valve 102, leads to the low-reverse valve 103 to supply the line pressure to the low-reverse valve 103. When the low-reverse valve 103 has shifted its spool to its left end position, the line pressure is supplied to the pressure chamber of the reverse clutch (RVC) 52 through a reverse clutch pressure line 180. A pressure line 181, branching off from the third output pressure line 153, leads to the bypass valve 104 and supplies the line pressure as pilot pressure to the control port of the low-reverse valve 103 through the pressure line 158 to cause the low-reverse valve 103 to force the spool toward the left end position.

Converter relief valve 115 receives the hydraulic operating pressure from the regulator valve 101 through a pressure line 182 and, after adjusting it to a specific level, delivers the specific level of hydraulic operating pressure to the lockup control valve 106 through a pressure line 183. This specific level of hydraulic operating pressure is then supplied to the front pressure chamber (FPC) of the lockup clutch (LUC) 26 through the pressure line 179 while the lockup control valve 106 places the spool at its right end position, or to the rear pressure chamber (RPC) of the lockup clutch (LUC) 26 through a pressure line 184 while it places the spool at its left end position. The lockup clutch (LUC) 26 is released by applying the specific level of hydraulic operating pressure to the front pressure chamber (FPC) thereof, and is locked by applying the specific level of hydraulic operating pressure to the rear pressure chamber (RPC) thereof. In the event of locking the lockup clutch (LUC) 26, when the lockup control valve 106 has shifted the spool to the left end position, locking pressure for the lockup clutch (LUC) 26 corresponds to the hydraulic operating pressure which is generated through the third duty solenoid valve 123 and supplied to the front pressure chamber (FPC) of the lockup clutch (LUC) 26.

Regulator valve 101 is supplied with the control pressure at the regulation port 101a from the linear solenoid valve 131, and adjusts the line pressure to an appropriate level according to engine operating conditions, for example engine throttle positions. The regulator valve 101 has a reduction port 101b at an end opposite to the regulation port 101a through which the regulator valve 101 is supplied with the line pressure from the manual shift valve 102 through a pressure line 185 and adjust the line pressure to a lower level in the drive (D) range, the slow (S) range, the low (L) range and the neutral (N) range, or to a higher level in the reverse (R) range.

Figure 12:
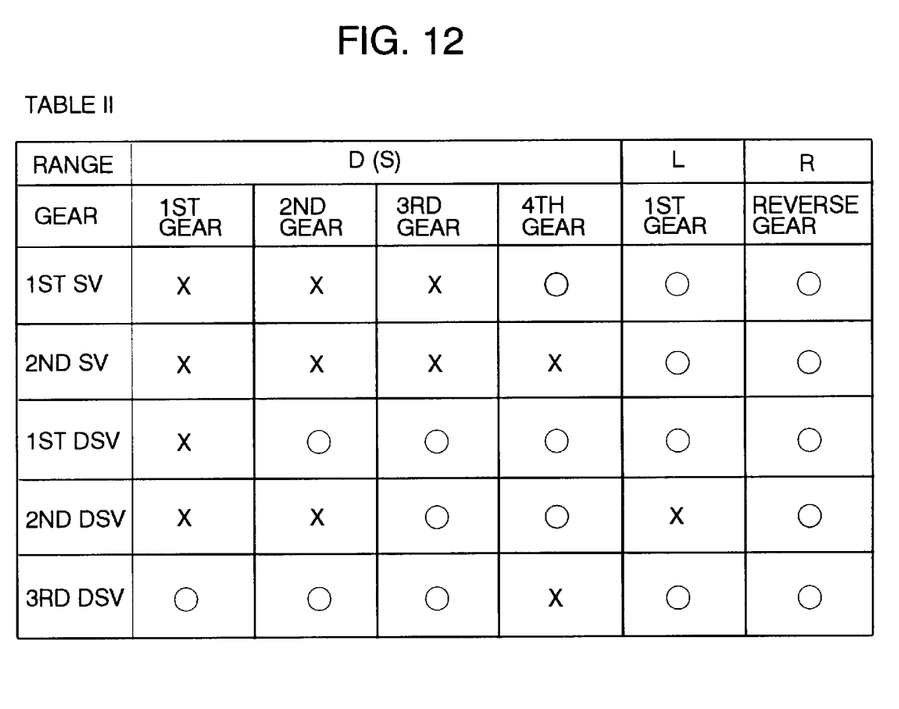
FIG. 12 is a table indicating operating patterns of solenoid valves.

Table II in FIG. 12 shows the supply of hydraulic operating pressure to and the release of hydraulic operating pressure from the pressure chambers of the respective clutch and brakes 51 through 55 in relation to the operation of first and second solenoid valves 111 and 112 as well as first, second, and third duty solenoid valves 121, 122, and 123. In the Table II, a circle (○) indicates a condition in which the solenoid valve 111, 112 assumes an ON state and the duty solenoid valve 121, 122, 123 assumes an OFF state. In this condition, the valve brings its upstream and downstream pressure lines into communication with each other. A cross (X) indicates a condition in which the solenoid valve 111, 112 assumes an OFF state and the duty solenoid valve 121, 122, 123 assumes an ON state. In this condition, the valve shuts off the pressure line upstream therefrom and drains the pressure line downstream therefrom.

The following discussion is directed to the second accumulator 133 which operates when the automatic transmission is shifted to the 2nd gear or the reverse gear.

Figure 3:
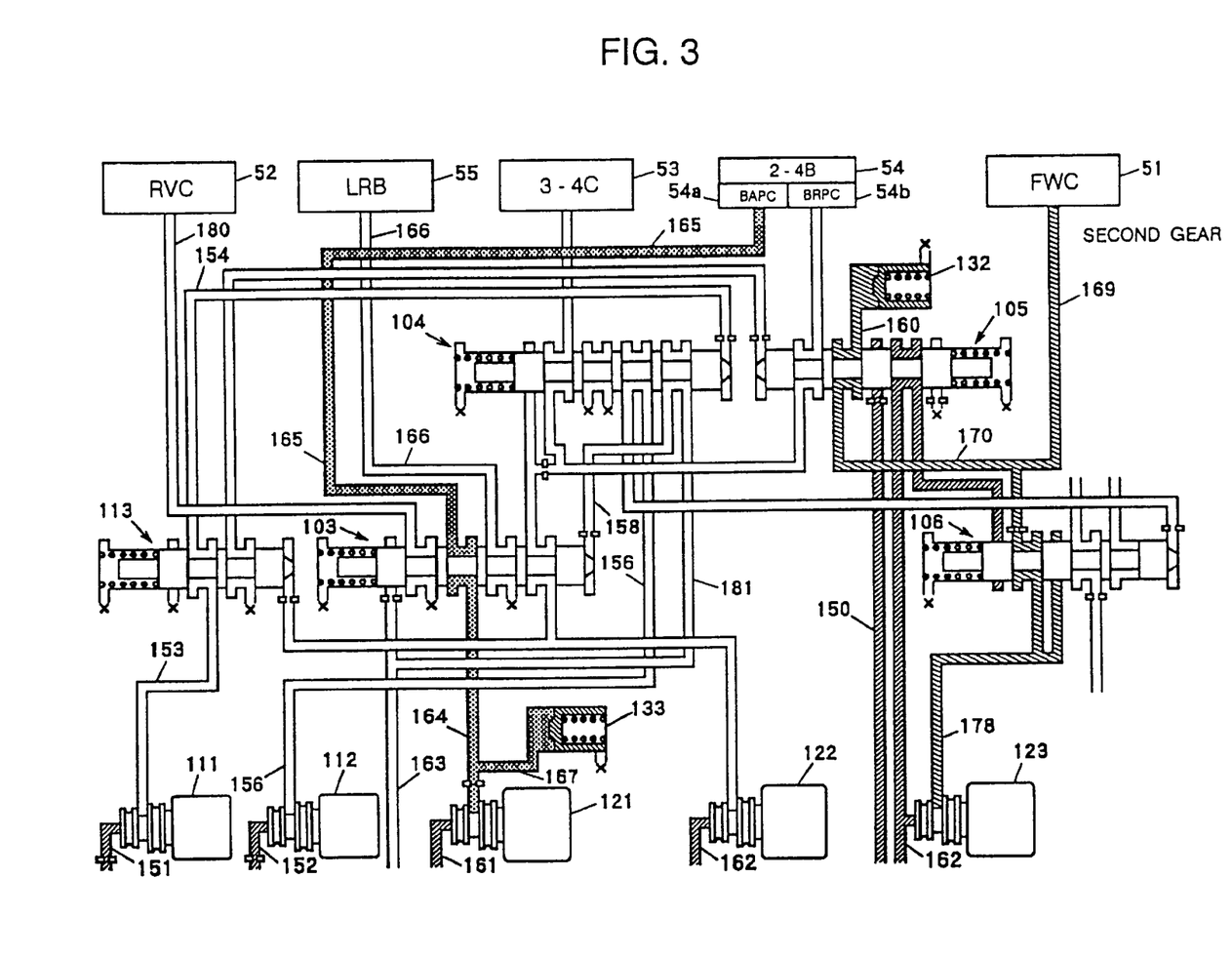
FIG. 3 is an enlarged diagram of an essential section of the hydraulic control circuit of FIG. 2 which is in 2nd gear.

As shown in FIG. 3, in 2nd gear as well as in the 1st gear, the hydraulic operating pressure generated at the third duty solenoid valve 123 is supplied to the pressure chamber of the forward clutch 51 through the forward clutch pressure line 169 from the pressure line 178 via the lockup control valve 106 in order to put the forward clutch (FWC) 51 in a locked condition. At the same time, the first duty solenoid valve 121 supplies the hydraulic operating pressure generated at the first duty solenoid valve 121 as brake apply pressure to the brake apply pressure chamber (BAPC) 54a of the 2-4 brake (2-4B) 54 through the brake apply pressure line 165 from the pressure line 164 via the low-reverse valve 103, thus causing the 2-4 brake (2-4B) 54 to lock. In this instance, the second accumulator 133 has been brought into communication with the pressure line 164 between the first duty solenoid valve 121 and the low-reverse valve 103 through the pressure line 167, and resultingly operates, on one hand, to moderate the supply of brake apply pressure to the 2-4 brake (2-4B) 54 during a 1st to 2nd gear shift to cause the 2-4 brake to lock gently, and, on the other hand, to absorb fluctuations in hydraulic operating pressure generated at the first duty solenoid valve 121 during the 1st to 2nd gear shift or in the 2nd gear.

Figure 4:
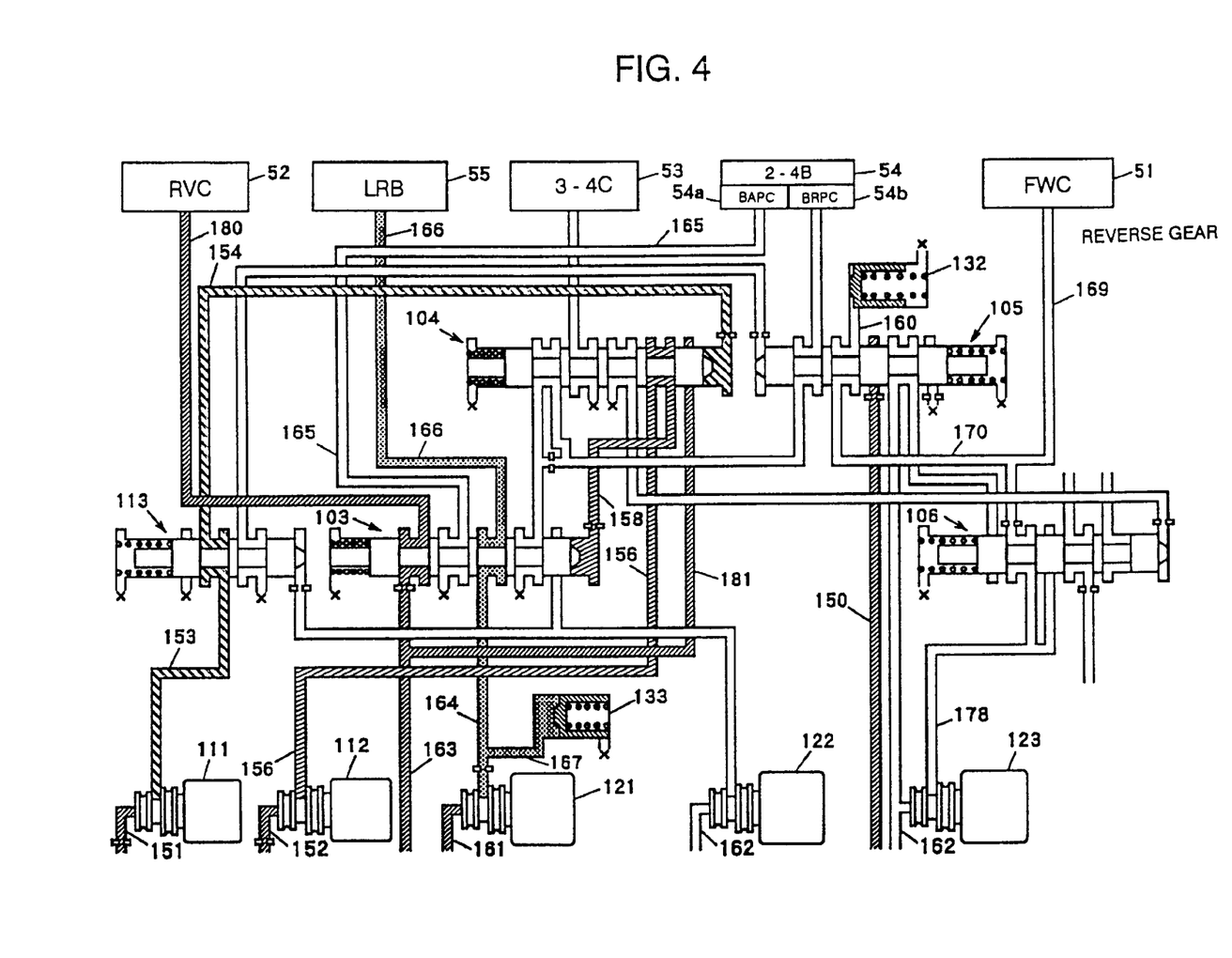
FIG. 4 is an enlarged diagram of an essential section of the hydraulic control circuit of FIG. 2 which is in reverse gear.

When the automatic transmission is placed into the reverse gear, as shown in FIG. 4, the first and second solenoid valves 111 and 112 activate to apply the hydraulic operating pressure to the bypass valve 104 through the pressure lines 153 and 154, and to the low-reverse valve 103 through the pressure line 158 from the pressure line 156 via the bypass valve 104, thus causing the bypass valve 104 and the low-reverse valve 103 to shift their spools to their left end positions, respectively. In this condition, the hydraulic operating pressure generated at the first duty solenoid valve 121 is applied to the pressure chamber of the low-reverse brake (LRB) 55 as low-reverse brake locking pressure through the low-reverse brake pressure line 166 from the pressure line 164 via the low-reverse valve 103. Further, the line pressure applied to the third output pressure line 163 from the manual shift valve 102 (shown in FIG. 2) is directed to the pressure chamber of the reverse clutch (RVC) 52 as reverse clutch locking pressure through the reverse clutch pressure line 180 via the low-reverse valve 103 whose spool is in its left end position. Thus both engaging reverse clutch (RVC) 52 and low-reverse brake (LRB) 55 are caused to lock. In this condition, the reverse clutch (RVC) 52 remains locked when the low-reverse valve 103 holds the spool at its left end position even when the neutral (N) range is selected because the line pressure is supplied to the third output pressure line 163 from the manual shift valve 102. Accordingly, when the manual shift lever is changed from a neutral position to a reverse position, the low-reverse brake (LRB) 55 is locked with the low-reverse brake locking pressure generated at the first duty solenoid valve 121 as well as the reverse clutch (RVC) 52. As explained previously, because the second accumulator 133 is connected to the pressure line 164 between the first duty solenoid valve 121 and low-reverse valve 103 by means of the pressure line 167, the second accumulator 133 is able to modulate the supply of hydraulic operating pressure to the low-reverse brake (LRB) 55, i.e. locking the low-reverse brake (LRB) 55, when a gear shift is executed from neutral to reverse, and is further able to absorb fluctuations in hydraulic operating pressure generated at the first duty solenoid valve 121 during a gear shift from neutral to reverse or in the reverse gear.

In the manner as described above, the second accumulator 133 operates to act on the brake apply pressure generated at the first duty solenoid valve 121 and the low-reverse brake pressure. In this instance, this brake apply pressure, which can be supplied during a wide range of engine conditions from when the engine throttle is fully opened until fully opened, has a higher highest level and, distinctively, the low-reverse brake pressure, which can be supplied when the engine throttle valve is at slightly small openings or fully closed, has a lower highest level. Resultingly, the second accumulator 133 is able to effectively absorb fluctuations in hydraulic operating pressure when it is at the high effective level as well as when it is at the low effective level.

Figure 5:
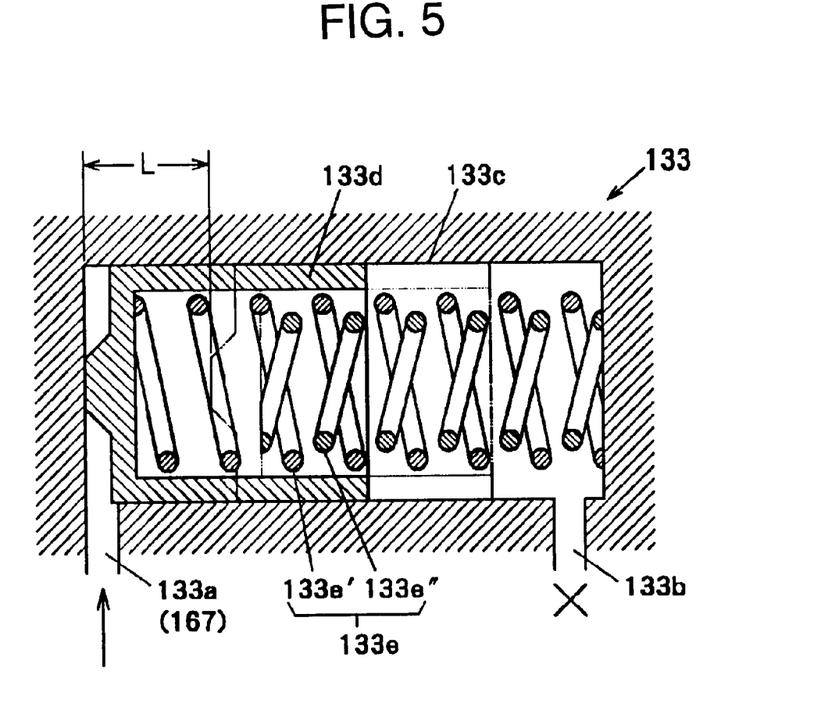
FIG. 5 is an enlarged view showing an accumulator installed in the hydraulic control circuit of FIG. 2.

As shown in FIG. 5 showing structural details of the second accumulator 133, the second accumulator 133 is comprised of a cylinder 133c incorporating a pressure input port 133a at one extremity which is connected to the pressure line 167, a drain port 133b at the other extremity, and a piston 133d received within the cylinder 133c, and a compression spring 133e by which the piston 133d is forced toward the extremity of the cylinder 133c where the pressure input port 133a is incorporated. The compression spring 133e is comprised of a first compression spring 133e', which operates throughout the entire range of a stroke of the piston 133d, and a second compression spring 133e" shorter in length than the first compression spring 133e', which operates only when the piston 133d exceeds a specified distance L from its initial position.

Figure 6:
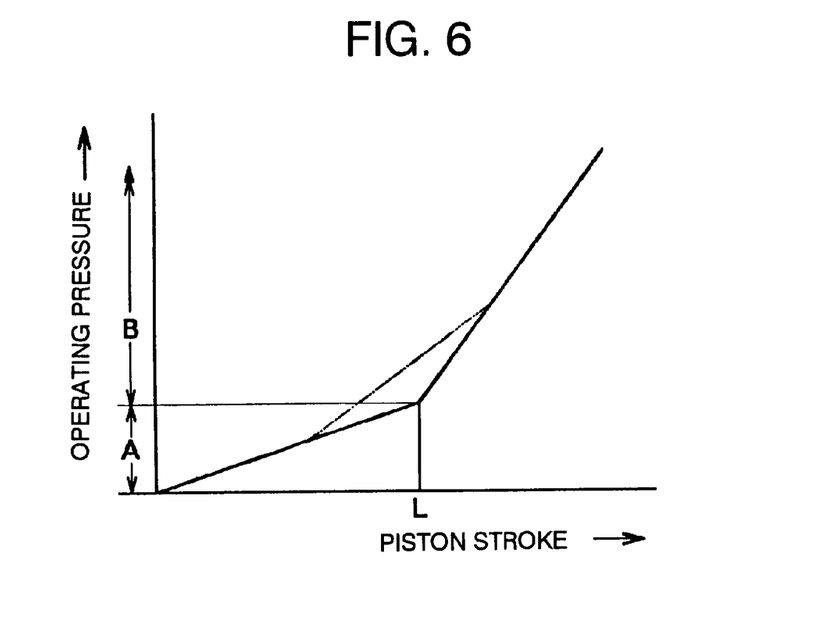
FIG. 6 is a diagram illustrating an operating characteristic of the accumulator of FIG. 5.

As shown in FIG. 6, when hydraulic operating pressure applied to the second accumulator 133 is in a low range of pressure levels designated as a symbol A, that is, when the piston 133d moves within the distance L, the hydraulic operating pressure is increased at a small rate of changing in relation to piston movement. When hydraulic operating pressure is in a high range of pressure levels designated as a symbol B, that is, when the piston 133d exceeds the distance L, the hydraulic operating pressure is increased at a higher rate of changing in relation to piston movement. In this way, the second accumulator 133 provides a two-step increase in pressure level in response to piston movement. That is, the combined operation of the separate compression springs 133e' and 133e" results in two different spring constants according to piston movement.

Accordingly, the second accumulator 133 provides a sufficient stroke of the piston 133d in the low range of pressure levels A in response to low effective hydraulic operating pressure applied to the low-reverse brake (LRB) 55 even which has small changes, and thus providing a gentle rise in pressure level of the hydraulic operating pressure and effective absorption of fluctuations in hydraulic operating pressure. Moreover, the second accumulator 133 provides a positive stroke of the piston 133d in the high range B of pressure level in response to changes in level of high effective brake apply pressure and thus providing a gentle rise in pressure level of the hydraulic operating pressure and effective absorption of fluctuations in hydraulic operating pressure. In other words, while, in cases where the compression spring has an invariable spring constant, the accumulator does not operate effectively in response to hydraulic operating pressure whose highest level is low if the invariable spring constant is large and, if the invariable spring constant is small, the compression spring would need an excessively long physical dimension to operate effectively in response to hydraulic operating pressure whose highest level is high, both of these problems must be dealt with in the design of the second accumulator 133.

In a design in which two compression springs 133e' and 133e" are utilized, these compression springs can operate without mutual entanglement when they are oriented in opposite directions in winding directions as shown in FIG. 5. Three compression springs having mutually different dimensions in length may be utilized, an accumulator becomes possible in which hydraulic operating pressure is increased at a changing rate variable in three steps as shown by broken line in FIG. 6 according to piston movements. Furthermore, as demonstrated by an accumulator 233 shown in FIG. 7, a compression spring 233e may be constructed as having a non-uniform coil pitch but have an uniform coil diameter. This type of compression spring 233e reacts to an increase in hydraulic operating pressure by initial compression at a section of large coil pitch followed by progressive compression at a section of small coil pitch, thus providing an increasingly larger spring constant with progress of the compression.

Figure 8:
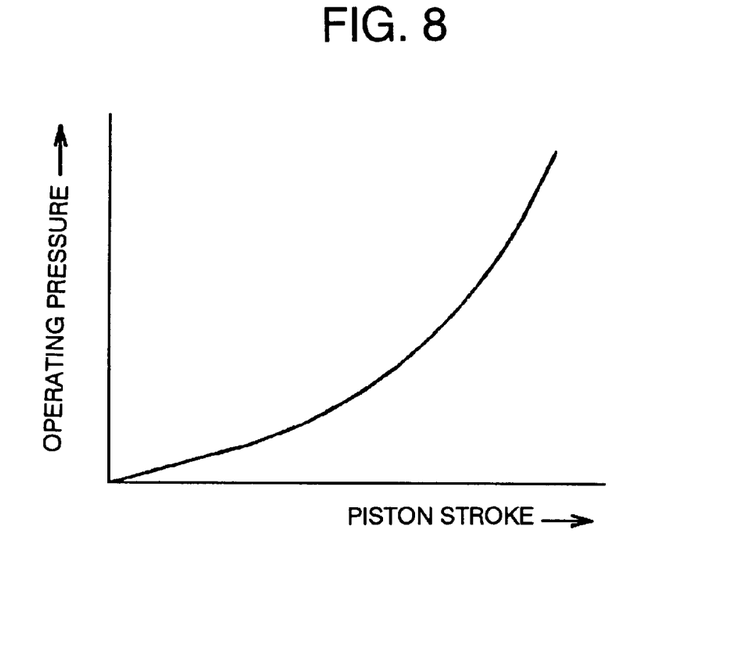
FIG. 8 is a diagram illustrating an operating characteristic of the accumulator of FIG. 7.

With the accumulator 233, an effect is realized in which the hydraulic operating pressure increases at a steplessly variable rate with an increase in piston movement as shown in FIG. 8, and thus a sufficient stroke of the piston 233d is provided in response to low reverse brake pressure whose highest level is low even when the low reverse brake pressure increases at a low changing rate, and further, changes or fluctuations in hydraulic operating pressure can be reliably absorbed even for brake apply pressure whose highest level is high without incorporating a compression spring having an excessively long length.

Figure 9:
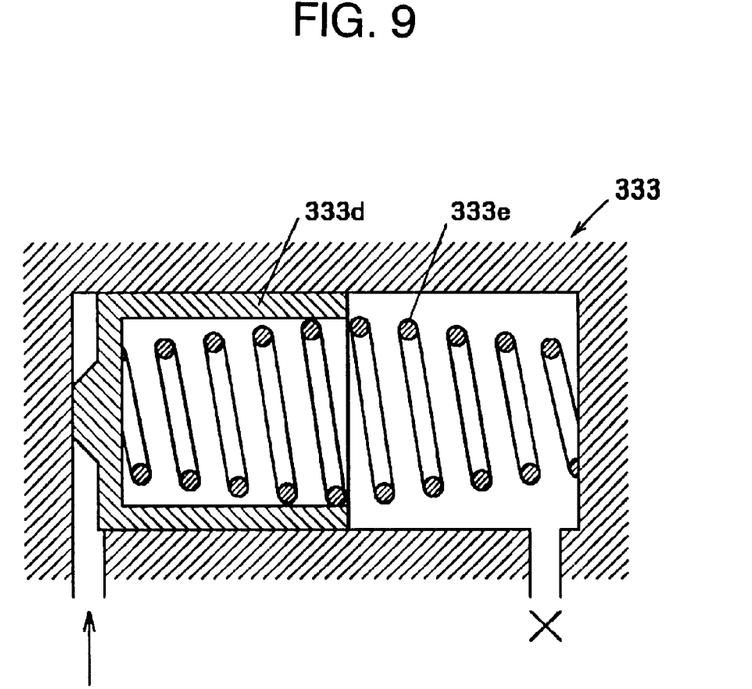
FIG. 9 is an enlarged view showing another variation of the accumulator shown in FIG. 5.

As demonstrated by an accumulator 333e shown in FIG. 9, a compression spring 333e may have a non-uniform coil diameter but has a uniform coil pitch. This type of compression spring 333e reacts to an increase in hydraulic operating pressure by initial compressing at a section of large coil diameter followed by subsequently progressive compression at a section of small coil diameter, thus providing an increasingly larger spring constant with progress of the compression. This accumulator configuration provides for the same type of a increase in hydraulic operating pressure at a steplessly variable rate with an increase in piston movement as shown in FIG. 8, and thus allows the accumulator to effectively operate in response to both reverse brake pressure whose highest level is low and brake apply pressure whose highest level is high.

Figure 7:
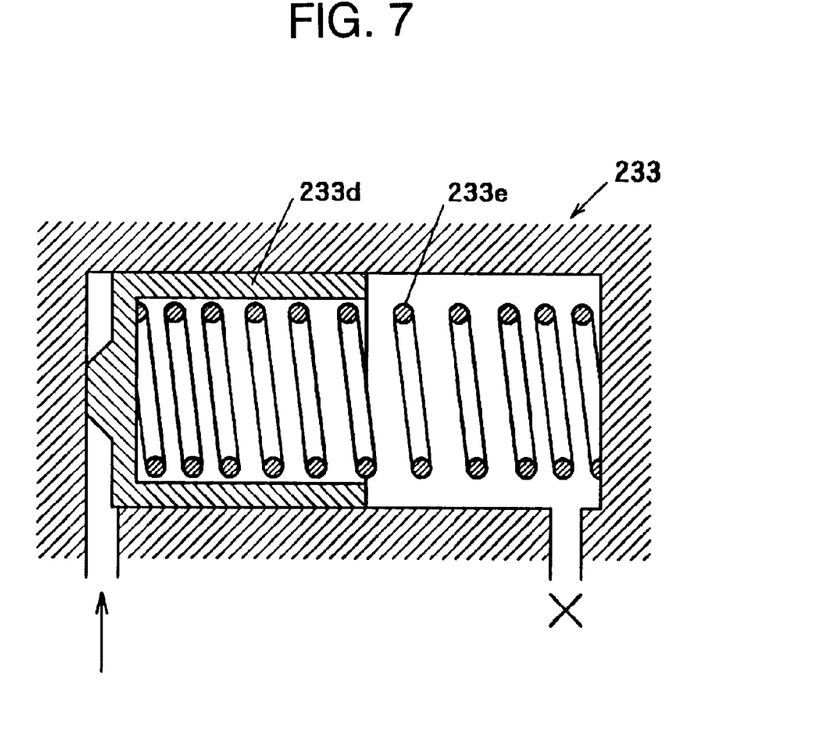
FIG. 7 is an enlarged view showing a variation of the accumulator shown in FIG. 5.

In the above embodiments, the accumulators 133, 233 or 333 is installed to the pressure line 164 between the first duty solenoid valve 121 which operates as a pressure source common to two friction coupling elements, namely the 2-4 brake (2-4B) 54 and the low-reverse brake (LRB) 55, and the low-reverse valve 103 serving as a switching means, and therefore, when the first duty solenoid valve 121 as a pressure source is brought into communication selectively with the two friction coupling elements through switching operation of the low-reverse valve 103, the accumulator is automatically brought into communication with either one of the two friction coupling element selected to be supplied with hydraulic operating pressure. This switching operation is executable without the necessity of an additional and separate switching means.

Figure 10:
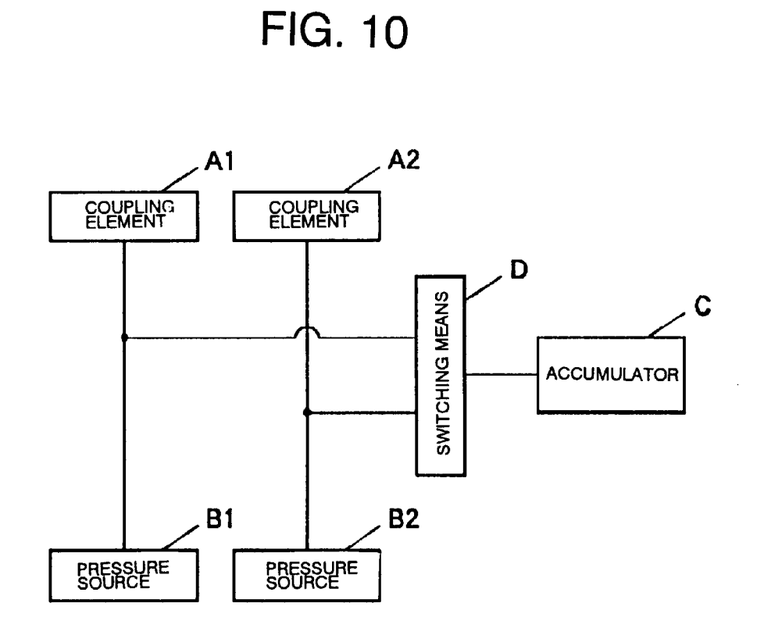
FIG. 10 is a block diagram illustrating another hydraulic control circuit of the hydraulic control system of the invention.

FIG. 10 shows another hydraulic control circuit having separate pressure sources B1 and B2 cooperative with two friction coupling elements A1 and A2, respectively, between which no switching means is installed. In this configuration of hydraulic control circuit, an accumulator C is brought into communication with either one of the two friction coupling elements A1 and A2 selected to be supplied with hydraulic operating pressure through a special switching means D. In this case, the accumulator having a configuration like those shown in FIGS. 5, 7 or 9 may be incorporated with a result of effectively interacting with both the two friction coupling elements when hydraulic operating pressure supplied to the friction coupling elements have different highest levels.

With the hydraulic control system for automatic transmissions of the invention described herein, in the case where the hydraulic control circuit includes an accumulator installed in relation to two friction coupling elements capable of operating in response to different levels of hydraulic operating pressure, the accumulator is structured so as to be brought into communication selectively with the two frictional coupling element through a switching means and to provide an operational characteristic in which a changing rate of hydraulic operating pressure is greater when the accumulator causes longer piston movement as compared with when it causes smaller piston movement, a highly effective piston stroke is realized in response to changes in the hydraulic operating pressure which is supplied to one of the frictional coupling elements which demands a low maximum operating pressure level, and a positive stroke of piston is provided in response to changes in the hydraulic operating pressure which is supplied to another frictional coupling element which demands a higher highest operating pressure level. Resultingly, hydraulic pressure fluctuations are adequately absorbed even during supply of hydraulic operating pressure to any one of the friction coupling elements through the accumulator which is not necessary to have an excessively long physical dimension of accumulator spring.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A hydraulic control system having a hydraulic control circuit for supplying hydraulic operating pressure selectively to a plurality of friction coupling elements to change a torque transmission path of a transmission gear mechanism, said hydraulic control system comprising:

hydraulic pressure generating means for generating said hydraulic operating pressure and supplying said hydraulic operating pressure to specific ones of said friction coupling elements which operate in response to said hydraulic operating pressure at different highest levels;

an accumulator having a spring loaded piston for providing a changing rate of said hydraulic operating pressure relative to a change in piston stroke of said spring loaded piston; and switching means for bringing said accumulator into communication selectively with said specific friction coupling elements;

wherein said changing rate is greater in a range of greater piston strokes of said spring loaded piston than in a range of smaller piston strokes of said spring loaded piston so as thereby to absorb fluctuations in said hydraulic operating pressure only in said range of smaller piston strokes while said accumulator is in communication with one of said specific friction coupling elements which has a highest level of said hydraulic operating pressure lower than that of another one of said specific friction coupling elements and to absorb fluctuations in said hydraulic operating pressure only in said range of greater piston strokes while said accumulator is in communication with said another specific friction coupling element which has a highest level of said hydraulic operating pressure higher than that of said one of said specific friction coupling elements.

2. A hydraulic control system as defined in claim 1, wherein said hydraulic control circuit includes a hydraulic pressure source common to said specific friction coupling elements and a single pressure line through which said hydraulic pressure source is connected to said switching means and in which said accumulator is installed upstream from said switching means.

3. A hydraulic control system as defined in claim 1, wherein said hydraulic pressure generating means comprises a duty solenoid valve which generates said hydraulic operating pressure in response to line pressure as source pressure.

4. A hydraulic control system as defined in claim 1, wherein said changing rate is greater in a range of piston strokes of said spring loaded piston greater than a specified piston stroke than in a range of piston strokes of said spring loaded piston smaller than said specified piston stroke so as thereby to absorb fluctuations in said hydraulic operating pressure only in said range of piston strokes of said spring loaded piston smaller than said specified piston stroke while said accumulator is in communication with said one of said specific friction coupling elements which has said highest level of said hydraulic operating pressure lower than that of said another one of said specific friction coupling elements and to absorb fluctuations in said hydraulic operating pressure only in said range of piston strokes of said spring loaded piston greater than said specified piston stroke while said accumulator is in communication with said another specific friction coupling element which has said highest level of said hydraulic operating pressure higher than that of said one of said specific friction coupling elements.

5. A hydraulic control system as defined in claim 4, wherein said accumulator has a first spring which exerts spring force on said piston throughout an entirely available piston stroke of said piston and a second spring which exerts spring force on said piston only when said piston moves beyond said specified piston stroke.

6. A hydraulic control system as defined in claim 1, wherein said accumulator provides an increase in said hydraulic operating pressure at a changing rate steplessly variable with an increase in movement of said piston.

7. A hydraulic control system as defined in claim 1, wherein said accumulator has a compression coil spring which increases said changing rate of said hydraulic operating pressure with progress in compression of said compression spring.

8. A hydraulic control system as defined in claim 7, wherein said compression coil spring has a non-uniform coil pitch.

9. A hydraulic control system as defined in claim 7, wherein said compression coil spring has a non-uniform coil diameter.

10. A hydraulic control system having a hydraulic control circuit for supplying hydraulic operating pressure selectively to a plurality of friction coupling elements to change a torque transmission path of a transmission gear mechanism, said hydraulic control system comprising:

hydraulic pressure generating means for generating said hydraulic operating pressure and supplying said hydraulic operating pressure to a first said friction coupling element which operates in response to hydraulic operating pressure at a higher highest level than that of a second said friction coupling element during a 1st to 2nd gear shift, and said second said friction coupling element which operates in response to hydraulic operating pressure at a lower highest level than that of said first friction coupling element during a neutral to reverse range shift;

an accumulator having a spring loaded piston which provides a changing rate of said hydraulic operating pressure relative to a change in piston stroke of said spring loaded piston, said changing rate being greater in a range of greater piston strokes of said spring loaded piston than in a range of smaller piston strokes of said spring loaded piston; and switching means for bringing said accumulator into communication selectively with said first and second friction coupling elements.

11. A hydraulic control system for an automatic transmission having a plurality of friction coupling elements selectively engaged to change a torque transmission path of a transmission gear mechanism, said hydraulic control system comprising:

a hydraulic control circuit including a hydraulic pressure source for generating hydraulic operating pressure and a single pressure line, said hydraulic control circuit supplying said hydraulic operating pressure selectively to a first said friction coupling element which operates in response to hydraulic operating pressure at a higher highest level than that of a second said friction coupling element during a 1st to 2nd gear shift, and said second said friction coupling element which operates in response to hydraulic operating pressure at a lower highest level than that of said first friction coupling element during a neutral to reverse range shift;

an accumulator installed in said single pressure line and having a spring loaded piston for providing a changing rate of said hydraulic operating pressure relative to a change in piston stroke of said spring loaded piston, said changing rate being greater in a range of piston stokes of said spring loaded piston greater than a specified piston stroke than in a range of piston strokes of said spring loaded piston smaller than said specified piston stroke; and a shift valve connected to said hydraulic pressure source through said single pressure line to bring said accumulator into communication selectively with said first and second friction coupling elements.

12. A hydraulic control system for an automatic transmission having a plurality of friction coupling elements selectively engaged to change a torque transmission path of a transmission gear mechanism, said hydraulic control system comprising:

a hydraulic control circuit including a hydraulic pressure source for generating hydraulic operating pressure and a single pressure line, said hydraulic control circuit supplying said hydraulic operating pressure selectively to specific ones of said friction coupling elements which operate in response to said hydraulic operating pressure at different highest levels;

an accumulator installed in said single pressure line and having a spring loaded piston for providing a changing rate of said hydraulic operating pressure relative to a change in piston stroke of said spring loaded piston; and a shift valve connected to said hydraulic pressure source through said single pressure line to bring said accumulator into communication selectively with said specific friction coupling elements;

wherein said changing rate is greater in a range of greater piston strokes of said spring loaded piston than in a range of smaller piston strokes of said spring loaded piston so as thereby to absorb fluctuations in said hydraulic operating pressure only in said range of smaller piston strokes while said accumulator is in communication with one of said specific friction coupling elements which has a highest level of said hydraulic operating pressure lower than that of another one of said specific friction coupling elements and to absorb fluctuations in said hydraulic operating pressure only in said range of greater piston strokes while said accumulator is in communication with said another specific friction coupling element which has a highest level of said hydraulic operating pressure higher than that of said one of said specific friction coupling elements.

13. A hydraulic control system for an automatic transmission having a plurality of friction coupling elements selectively engaged to change a torque transmission path of a transmission gear mechanism, said hydraulic control system comprising:

a hydraulic control circuit including a hydraulic pressure source for generating hydraulic operating pressure and a single pressure line, said hydraulic control circuit supplying said hydraulic operating pressure selectively to a first said friction coupling element which operates in response to hydraulic operating pressure at a higher highest level than that of a second said friction coupling element during a 1st to 2nd gear shift, and said second said friction coupling element which operates in response to hydraulic operating pressure at a lower highest level that of said first friction coupling element during a neutral to reverse range shift;

an accumulator installed in said single pressure line and having a spring loaded piston for providing a changing rate of said hydraulic operating pressure relative to change in piston stroke of said spring loaded piston, said changing rate being greater in a range of greater piston strokes of said spring loaded piston than in a range of smaller piston strokes of said spring loaded piston; and;

a shift valve connected to said hydraulic pressure source through said single pressure line to bring said accumulator into communication selectively with said first and second friction coupling elements.

14. A hydraulic control system for an automatic transmission having a plurality of friction coupling elements selectively engaged to change a torque transmission path of a transmission gear mechanism, said hydraulic control system comprising:

a hydraulic control circuit including a hydraulic pressure source for generating hydraulic operating pressure and a single pressure line, said hydraulic control circuit supplying said hydraulic operating pressure selectively to specific ones of said friction coupling elements which operate in response to said hydraulic operating pressure at different highest levels;

an accumulator installed in said single pressure line and having a spring loaded piston for providing a changing rate of said hydraulic operating pressure relative to a change in piston stroke of said spring loaded piston; and a shift valve connected to said hydraulic pressure source through said single pressure line to bring said accumulator into communication selectively with said specific friction coupling elements;

wherein said changing rate is greater in a range of greater piston strokes of said spring loaded piston than in a range of smaller piston strokes of said spring loaded piston so as thereby to absorb fluctuations in said hydraulic operating pressure only in said range of smaller piston strokes while said accumulator is in communication with one of said specific friction coupling elements which has a highest level of said hydraulic operating pressure lower than that of another one of said specific friction coupling elements and to absorb fluctuations in said hydraulic operating pressure only in said range of greater piston strokes while said accumulator is in communication with said another specific friction coupling element which has a highest level of said hydraulic operating pressure higher than that of said one of said specific friction coupling elements.

\* \* \* \* \*